United States Patent [19]

Saleh

[11] Patent Number: 4,538,414
[45] Date of Patent: Sep. 3, 1985

[54] APPARATUS FOR PREVENTING BLOWING OUT OF THE WATER SUPPLY OF CONSTANT PRESSURE AIR STORAGE INSTALLATIONS OF GAS TURBINE POWER PLANTS

[75] Inventor: Abdel Saleh, Hohentengen-Herdern, Fed. Rep. of Germany

[73] Assignee: BBC Brown, Boveri & Company Limited, Baden, Switzerland

[21] Appl. No.: 461,471

[22] Filed: Jan. 27, 1983

[30] Foreign Application Priority Data

Feb. 17, 1982 [CH] Switzerland .............................. 973/82

[51] Int. Cl.³ .............................................. F15B 11/06
[52] U.S. Cl. ........................................ 60/398; 405/53; 405/59
[58] Field of Search .......................... 60/398, 727, 327; 405/53, 59; 55/52, 196

[56] References Cited

U.S. PATENT DOCUMENTS

| | | | |
|---|---|---|---|
| 3,895,493 | 7/1975 | Rigollot | 60/398 |
| 4,045,963 | 9/1977 | Hansson et al. | 405/53 |
| 4,180,980 | 1/1980 | Marks et al. | 60/398 |
| 4,355,923 | 10/1982 | Scharzenbach | 60/398 |
| 4,391,552 | 7/1983 | O'Hara | 60/398 |

Primary Examiner—Robert E. Garrett
Assistant Examiner—John M. Husar
Attorney, Agent, or Firm—Werner W. Kleeman

[57] ABSTRACT

In the apparatus for preventing blowing out of the water supply in constant pressure air storage installations of gas turbine power plants, the layer of water, which is close to the surface in a cavern and in which dissolved air is concentrated, is withdrawn through tubes of a grate arrangement and a riser tube communicating therewith which extends in a water shaft and opens into a compensation basin, by introducing compressed air into the riser tube from an aeration tube. Consequently, the water of the cavern is transported into the water layer close to the surface in the compensation basin.

5 Claims, 2 Drawing Figures

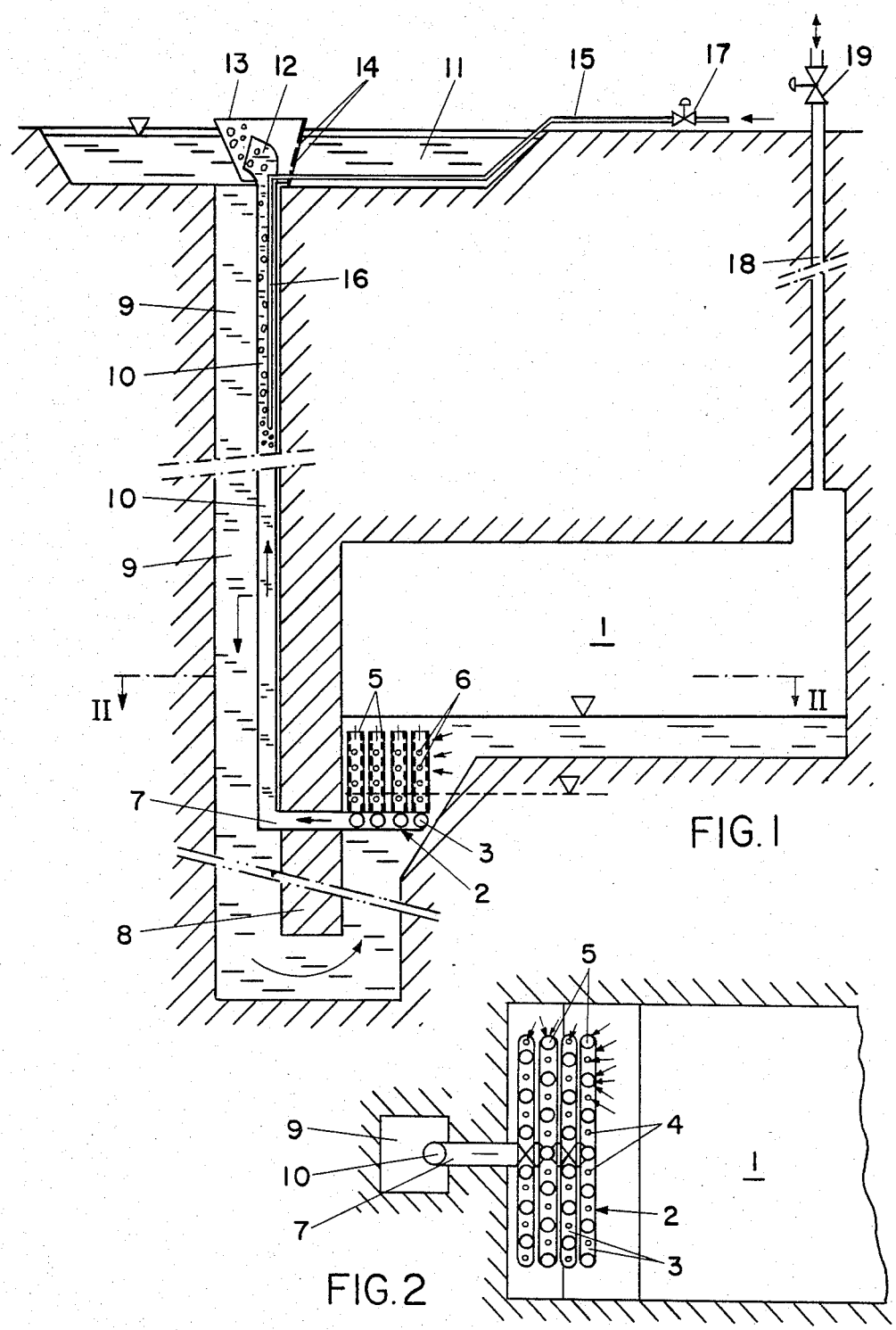

APPARATUS FOR PREVENTING BLOWING OUT OF THE WATER SUPPLY OF CONSTANT PRESSURE AIR STORAGE INSTALLATIONS OF GAS TURBINE POWER PLANTS

CROSS REFERENCE TO RELATED APPLICATIONS

This application is related to the commonly assigned, copending U.S. application Ser. No. 06/193,097, filed Oct. 2, 1980, since granted as U.S. Pat. No. 4,392,354 on July 12, 1983, and entitled "Constant Pressure Air Storage Installation With Water Supply For Gas Turbine Power Plants". This application is also related to the commonly assigned U.S. Pat. No. 4,343,569, granted Aug. 10, 1982 and entitled "Apparatus For Preventing Blowout Of the Water Supply of Constant Pressure Air Storage Installations Of Gas Turbine Power Plants", and the commonly assigned U.S. Pat. No. 4,355,923, granted Oct. 26, 1982, and entitled "Constant Pressure Storage Installation With Water Supply For Gas Turbine Power Plants".

BACKGROUND OF THE INVENTION

The present invention relates to a new and improved apparatus for preventing the blowing out of the water supply from a water shaft or chute in a constant pressure air storage installation of a gas turbine power plant.

In its more particular aspects, the apparatus of the present development is of the type including a subterranean cavern for storing compressed air, conduits connecting the cavern and the gas turbine or a compressor thereof, respectively, and a compensation basin communicating with the water in the cavern through the water shaft or chute.

Constant pressure air storage installations for gas turbine power plants, in relation to air storage installations working with variable air pressure and having the same output or efficiency, and which air pressure can fluctuate within certain limits during operation, require only about one-third of the volume of the last-mentioned type of air storage installations. Hence, the structural expenditure and the erection costs of a cavern for a constant pressure storage installation are appreciably less than in the case of caverns working with variable air pressure.

To maintain the air pressure of a constant pressure storage installation constant there is used a water supply having a water column. The water supply compensates or balances the volume of air which has been consumed in the cavern. The water column opens into a free basin which is usually located at ground level and whose static pressure height corresponds to charging of the cavern, which with present day installations is located at a depth in the order of about 600 to 800 meters, corresponding to a static pressure of the water column of 60 to 80 bar, the water is forced upwards into the compensation basin, and during discharge of the cavern the water runs out of the basin into the cavern in order to ensure for the same pressure conditions.

During operation of air storage gas turbine installations it has been found that during charging of the cavern the water column which rises in the water shaft or chute containing the water supply releases the air which is dissolved in the water column. Hence, air bubbles are formed which, in upward direction, rapidly increase in volume. These air bubbles cause a density reduction within the water column, and thus, oscillations of such water column. In the extreme case, the water column could be blown out by the compressed air cushion, and thus, the cavern could completely empty.

In contrast to the normal velocity of dissolution of air in static water, the complete saturation occurs more rapidly in the cavern owing to the pronounced turbulence of the water during the charging and discharging operations, since after a very short amount of time all of the water particles come into contact with the air at the water surface. The quantity by weight of air which is taken-up by the water is proportional to the pressure, which, as stated, is in the order of between 60 and 80 bar. As to the thus dissolved air quantity the following comparison is informative:

At 1 bar air pressure and 10° C. temperature 1 m$^3$ water (=1000 kg) contains 29.2 grams air.

At 60 bar pressure and 10° C. temperature 1 m$^3$ water contains 1.7 kg air, in other words approximately 58 times the amount by weight. At atmospheric pressure such 1.7 kg air corresponds to about 1.32 m$^3$. A water/air mixture which has expanded from 60 bar pressure to atmospheric pressure therefore contains more air than water in volume.

If water which has been saturated with air in this manner ascends upwardly out of the cavern, then due to the decreasing hydrostatic pressure the air is released and forms increasingly larger size bubbles. The average density of the water column thus becomes increasingly smaller and oscillations of the water column occur. If there are not undertaken appropriate measures this pressure drop can lead to a blow-out of the compressed air cushion along with the water column.

A heretofore known measure for preventing this blow-out resided in extending the water shaft or chute containing the water column along a U-shaped arc below the base of the cavern. The lowest point of the water shaft therefore must be located at least 0.15 h below the momentary water level within the cavern, wherein h represents the effective pressure height, i.e. the difference between the geodetic height of the surface water level in the compensation or balancing basin and the cavern water level.

With h=600 meters this would mean that the already 600 meter long water shaft must be guided downwardly by still at least an additional 90 meters, and specifically twice resulting in an impermissibly great increase in the costs of the construction.

Other suggestions aim at totally or partially preventing contact between the air and water by means of a protective layer placed upon the water surface. The protective layer, for example, may be a foil, a layer of a very slowly evaporating liquid, or a layer of small buoyant bodies floating on the water and forming a coherent cover thereon. A further suggestion is intended to brake the rapid ascent of the water/air mixture in the water supply and to separate the air bubbles from the water by appropriate fixtures or facilities. The ideal method, namely completely preventing contact between the air and water at the water surface, is realized in practice only with very great difficulty. It still remains to be seen, whether the remaining methods can prevent, particularly after longer periods of shutdown, more or less spontaneous segregations of air in the water supply which generate oscillations in the water column. Such oscillations cause fluctuations in the pressure of the stored air which, primarily, can interfere with the compressor operation.

Recently a method and an apparatus operating in accordance therewith have been suggested for the purpose discussed herein (see European Patent Application No. 81200690.6). This method and apparatus are based upon the principle of continuously withdrawing by suction the water layer which is close to the surface of the water in the cavern and in which primarily the air is concentrated, through a tube system and by pumping the same to the water surface in the compensation basin where such water will release the dissolved air due to the lower pressure. The water which has been withdrawn is replaced from the water supply either continuously or intermittently by using de-aerated water from the compensation basin. Accordingly, only de-aerated water is present in the water shaft, since no air can diffuse from the cavern into the water shaft.

The apparatus for carrying out this method contains within the cavern a grate of tubes floating on the water surface, which grate is constituted by a number of perforated tubes, a header or collecting tube and a number of floats. The perforated tubes open into the header. The water is withdrawn from the layer close to the surface by means of a swinging or pendulum tube located in the cavern and is conveyed to the water layer close to the surface in the compensation basin through a drain or suction pipe fixed in the water shaft by means of a pump and through a further swinging or pendulum tube in the compensation basin where the withdrawn water containing air is de-aerated by a further grate of tubes.

It would have to be assumed that the suction device in such an installation is not required to be in continuous operation, rather it will suffice to activate the same during weekends and during inspection and servicing of the storage installation during which the store is not emptied. During normal working days, practically the entire water content of the cavern will be admitted to the compensation basin, and thus, will be de-aerated so that, in general, the suction device can be placed out of operation.

This concept is disadvantageous due to the presence of moving components or parts, such as the pump in which the occurrence of cavitation must be taken into account, the articulated connections or joints interconnecting the stationary and the swinging sections of the suction pipe or conduit which are subject to wear and, like the pump, require some maintenance. Additionally, the floating grate of tubes including the vertical guiding means thereof constitutes a structurally expensive and correspondingly costly system which, furthermore, is difficult to install.

SUMMARY OF THE INVENTION

Therefore, with the foregoing in mind it is a primary object of the present invention to provide a new and improved apparatus for preventing the blowing out of the water supply from a water shaft or the like in a constant pressure air storage installation for a gas turbine power plant which does not exhibit the aforementioned drawbacks and which does not have the limitations present in the heretofore known prior art apparatuses of the type under discussion.

Another and more specific object of the present invention aims at providing an apparatus of the initially mentioned type which is simple in construction and design and extremely reliable in operation.

Still a further significant object of the present invention is directed to a new and improved construction of apparatus for preventing the blowing out of the water supply from a water shaft or the like in a constant pressure air storage installation for a gas turbine power plant which does not include any movable elements or parts and which possesses absolute reliability in operation.

Now in order to implement these and still further objects of the invention, which will become more readily apparent as the description proceeds, the method of the present development is manifested by the features that, air is introduced into a water column communicating with the water in the cavern to generate a suctional flow; a water layer which is close to the surface of the water in the cavern and in which dissolved air is concentrated, is transported to a water layer which is close to the surface of water contained in the compensation basin by the suctional flow for de-aeration; and the water withdrawn from the layer close to the surface in the cavern is substituted by water flowing out of the compensation basin.

As to the apparatus of the present development, such is manifested by the features that a grate of tubes containing suction holes or apertures is firmly anchored in the cavern below a lowest possible water level thereof. A header or collecting pipe communicates with the tubes of the grate. The header or collecting pipe extends from the cavern into the water shaft and continues upwardly therein in the form of a riser tube opening into the compensation basin. There are also provided an aeration tube and a source of compressed air connected thereto, the aeration tube having an open end opening into the riser tube at an upper portion of the water shaft.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a vertical section through an exemplary embodiment of apparatus constructed according to the invention; and FIG. 2 is a horizontal section through the cavern of the apparatus shown in FIG. 1 above the water level therein, and taken substantially along the section line II—II of FIG. 1.

DETAILED DESCRIPTION OF THE PREFERRED EMBODIMENTS

The method according to the invention contemplates introducing compressed air into a water column communicating with a water supply in a water shaft or chute through a system of tubes firmly anchored in a cavern to initiate an upwardly directed suctional flow within the water column. As a result the surface water in the cavern which is rich in air is withdrawn and causes water containing less air to flow out of the water shaft or the like into the cavern.

Turning now to the drawings, it is to be understood that in order to simplify the illustration thereof, only enough of the construction of the apparatus has been shown as needed for those skilled in the art to readily understand the underlying principles and concepts of the present invention. Turning now specifically to FIGS. 1 and 2 of the drawings, the apparatus shown therein and employed to realize the method as described hereinbefore, comprises a subterranean cavern 1 and a stationary grate 2 of tubes 3 located at a level which is below the lowest permitted water level shown by dash or broken lines in FIG. 1. The tube grate 2 consists of a number of tubes 3 located in one plane and extending parallel to each other and having suction holes or openings 4 distributed about the circumference and length thereof. Vertical stand or upright pipes 5 open into the tubes 3 and also contain suction holes or openings 6 distributed about the circumference and over the length thereof. At the center of their longitudinal extension, the tubes 3 are connected to a header or collecting pipe 7 which passes through a partition or separation wall 8 disposed between the cavern 1 and a water shaft or chute 9 or the like into the latter to continue therein upwardly in the form of a riser tube 10. The riser tube or pipe 10 opens into a compensation or balancing basin 11 located above-ground where the riser tube 10 widens to form an outlet or discharge head 12. A deflector funnel 13 is arranged around the outlet head 12, and the outer wall or shell of the deflector funnel 13 is closed at the side situated opposite to the not particularly referenced outlet provided in the outlet head 12. The deflector funnel 13 is provided with passages or gaps 14 at the side opposite to the last mentioned side, so that the interior of the deflector funnel 13 flow communicates with the water contained in the compensation basin 11.

The deflector funnel 13 prevents the water neighboring the mouth or opening of the riser tube 10 from flowing into the water shaft 9 which would again entrain segregated air during its downward movement. The same effect is also achieved, for instance, by having the riser tube 10 open at an inclination or in a bent-off manner into the compensation basin 11 at a location spaced from the water shaft 9.

Above the floor of the compensation basin 11 a compressed air pipe or line 15 enters the riser tube 10 and continues downwardly therein in the form of an aeration tube or line 16, the lower end of which is open. The compressed air pipe 15 may be controlled by a remotely controlled valve 17 or equivalent structure and may be charged with compressed air either by a source of compressed air located in a machine hall of the power plant or directly from the compressor of the gas turbine. The compressor air line leading from the gas turbine compressor and for charging the cavern 1 has been designated by reference numeral 18, and a valve for controlling the charging and discharging operation has been designated by reference numeral 19.

To initiate withdrawal of the air-saturated surface water from the cavern 1, air is introduced into the aeration tube or pipe 16 via the compressed air pipe 15. The air leaves the lower end of the aeration tube 16 to enter the riser tube 10 and forms therein air bubbles dispersed in the water which thereby rises upwardly. Due to the suction caused thereby, the below situated water column in the riser tube 10 and the surface water in the cavern 1 are sucked upwardly through the suction holes or openings 4 and 6 in the grate 2 of tubes 3 and in the stand pipes 5, respectively, while, at the same time, the water withdrawn from the cavern 1 is replenished by water flowing-out of the water shaft 9.

After cutting-off the compressed air supply from the aeration tube 16, the sucked-off or withdrawn surface water, as long as it still contains a sufficient amount of dissolved air, possesses a self-driving action due to the formation of air bubbles during its ascent. The introduction of compressed air into the aeration tube 16 thus is only required to initiate the de-aeration process and may be cut-off when this process has been set into operation. From there onward the exchange will proceed by itself and come to rest after the gas concentration in the surface water has been completely balanced. Thus, after initiation the exchange is self-regulating. During the exchange operation the grate 2 of tubes 3 acts as a flow rectifier, whereby the fresh water flowing-out from the water shaft 9 is quieted and there are maintained small the admixing thereof with the air-saturated surface water and the concomitant air exchange.

The apparatus will have to be flush-cleaned only intermittently. Depending upon the number of charging operations within some given period of time, the flushing intervals may be shorter or longer and may, for example, amount to four weeks. For instance, it might be advantageous to initiate flush-cleaning each time at the final stage of a charge operation by a short-time air injection into the riser tube 10. Due to the large density decrease at the region of the strongest air segregation a substantially higher velocity will be adjusted in the riser tube 10 than would be the case just due to the water displacement from the cavern 1. This implies, however, that the rate of displacement of the water supply in the water shaft 9 will be correspondingly smaller, whereby the blow-out of the water supply, the so-called "champagne effect", is positively or safely prevented. Accordingly, it is not required to extend the U-shaped portion of the water shaft 9 to greater depths below the cavern 1, as mentioned initially, whereby a significant portion of the construction costs is saved.

When using the apparatus as described hereinbefore, the cavern does not have to be designed so as to deviate from a cubic shape so as to have, for example, an inclined floor such that the air-contacted water level is smaller, when the cavern is fully or partially charged, than in the emptied state thereof provided that the concentration gradient is constant throughout the entire water level. This may be considered correct in the present case since, as already mentioned, strong turbulence is avoided during charging.

When the cavern is excessively charged, the excess compressed air may escape through the riser tube 10 into the compensation basin 11 after the water level has fallen below the lowest permissible water level in the cavern 1. This is that level at which the compressed air enters the riser tube 10 after having passed through the suction holes 4, the grate 2 of tubes 3 and the header 7. Due to this escape, the pressure in the cavern 1 decreases and water flows out from the water shaft 9.

Instead of introducing the aeration tube or pipe 16 into the riser tube 10 at the upper end thereof, the aeration tube 16 also may extend outside of the riser tube 10 in the water shaft 9 or through the adjacent ground in order to laterally open into the riser tube 10 at a location where compressed air is to be blown into the riser tube 10. In this way the restriction in the cross-sectional area of the end portion of the riser tube 10 containing the air bubbles is eliminated.

While there are shown and described present preferred embodiments of the invention, it is to be distinctly understood that the invention is not limited thereto, but may be otherwise variously embodied and practiced within the scope of the following claims. Accordingly,

What I claim is:

1. In an apparatus for preventing the blowing out of a water supply from a water shaft in a constant pressure air storage installation for a gas turbine power plant containing a subterranean cavern for storing compressed air, conduit means for connecting said cavern and said gas turbine or a compressor thereof, respectively, a compensation basin having a floor and flow communicating with the water in said cavern through said water supply, the improvement which comprises:
- a grate of tubes firmly anchored in said cavern below a lowest permissible water level thereof;
- said tubes forming said grate being provided with suction holes;
- a header communicating with said tubes of said grate;
- said header extending from said cavern into said water shaft and continuing upwardly therein in the form of a riser tube opening into said compensation basin;
- an aeration tube and a source of compressed air connected thereto;
- said aeration tube having an open end; and
- said open end of said aeration tube opening into said riser tube at an upper portion of said water shaft.

2. The apparatus as defined in claim 1, further including:
- stand pipes having open upper ends and provided at said grate of tubes;
- said stand pipes opening into said tubes and having suction holes;
- said aeration tube being introduced into said riser tube above said floor of said compensation basin;
- an outlet head opening into said compensation basin at an end of said riser tube; and
- a deflector funnel surrounding said outlet head and flow communicating with said compensation basin.

3. The apparatus as defined in claim 1, wherein:
said aeration tube extends outside said riser tube and opens laterally into the same at a location thereof at which compressed air is introduced into said riser tube.

4. The apparatus as defined in claim 3, wherein:
said location of said riser tube at which compressed air is introduced lies above the surface of said water in said cavern.

5. The apparatus as defined in claim 1, wherein:
said upper portion of said water shaft lies above the surface of said water in said cavern.

* * * * *

UNITED STATES PATENT AND TRADEMARK OFFICE
CERTIFICATE OF CORRECTION

PATENT NO. : 4,538,414
DATED : September 3, 1985
INVENTOR(S) : ABDEL SALEH

It is certified that error appears in the above—identified patent and that said Letters Patent is hereby corrected as shown below:

Column 1, line 53, after "to" please insert

--the pressure which is to be maintained in the cavern. During--

Signed and Sealed this

Twenty-sixth Day of November 1985

[SEAL]

Attest:

Attesting Officer

DONALD J. QUIGG

Commissioner of Patents and Trademarks